United States Patent Office 3,438,899
Patented Apr. 15, 1969

3,438,899
ALKENYL SUCCINIMIDE OF TRIS
(AMINOALKYL) AMINE
George J. Benoit, Jr., San Anselmo, Calif., assignor to
Chevron Research Company, San Francisco, Calif., a
corporation of Delaware
No Drawing. Continuation-in-part of application Ser. No.
649,054, June 26, 1967. This application Feb. 23, 1968,
Ser. No. 707,427
Int. Cl. C10m 7/32
U.S. Cl. 252—51.5                                    4 Claims

ABSTRACT OF THE DISCLOSURE

Alkenyl succinimides of tris(aminoalkyl) amines suitable as ashless detergents in lubricating oil compositions are prepared by reaction of alkenyl succinic anhydrides or the corresponding alkenyl succinic acids and tris(aminoalkylene) amines. Said alkenyl groups containing from 30 to 200 carbon atoms and said amines containing from 6 to 9 carbon atoms.

CROSS REFERENCE TO RELATED APPLICATIONS

This application is a continuation-in-part of application Ser. No. 649,054, filed June 26, 1967, which in turn is a continuation-in-part of application Ser. No. 467,136, filed June 25, 1965, both now abandoned.

BACKGROUND OF THE INVENTION

Present-day internal combustion engines operate at high speeds and high compression ratios. When used in the so-called city stop-and-go driving—the major type of driving conditions for a larger percentage of today's automobiles—the internal combustion engines do not reach the most efficient operating temperature. Under city driving conditions, large amounts of partial oxidation products are formed and reach the crankcase of the engine by blowing past the piston rings. Most of these partial oxidation products are oil insoluble, tending to form deposits on the various operating parts of the engine, such as the pistons, piston rings, etc. For the purpose of preventing the deposition of these products on the various engine parts, it is necessary to incorporate detergents in the lubricating oil compositions, thus keeping these polymeric products highly dispersed in a condition unfavorable for deposition on metals.

Under the harsh conditions of the engine—oxidative, acidic, trace metal catalysis—detergents undergo decomposition. It is therefore desirable to have detergents which are able to retain their detersive capability—maintaining the polymeric materials in suspension—for long periods of time.

SUMMARY OF THE INVENTION

Pursuant to this invention, the reaction products of alkenylsuccinic anhydride and tris(aminoalkylene) amine of from 6 to 9 carbon atoms are provided which find use as detergents in lubricating oils.

The tris(aminoalkylene) amines have the following formula:

$$[H_2N(CH_2)_n]_3N$$

wherein $n$ is an integer of from 2 to 3. The amines used in this invention are characterized by (1) having three primary amino and one tertiary amino nitrogens, as the only heteroatoms present and (2) being of from 6 to 9 carbon atoms.

The alkenylsuccinic anhydride used is of the following formula:

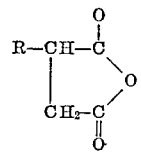

wherein R is an alkenyl group, most conveniently obtained by polymerizing an olefin containing from about 2 to 5 carbon atoms. The molecular weight of the resulting polymer will generally be in the range of about 400 to 3,000 more usually in the range of about 700 to 1,200. Useful olefins are illustrated by ethylene, propylene, 1-butene, 2-butene, isobutene, 1-pentene and mixtures thereof, preferably isobutene. The methods of polymerizing such olefins to the polymers of the designated molecular weight are well known in the art and do not require exemplification here. (See, for example, U.S. Patents Nos. 3,024,195 and 3,018,250.)

The succinimide derivatives are prepared by reacting the succinic anhydride compound with the desired amine at elevated temperatures, usually removing water. A solvent need not be used, although inert solvents may be used, such as polyethers, sulfoxides, pyridine, aromatic hydrocarbons, aliphatic hydrocarbons, etc. and mixtures thereof. The reactants will be present in from 1 to 50 weight percent of the solution.

Temperatures for the reaction will usually be in the range of 250°–600° F., preferably 300°–400° F. Depending on the temperature and reactants, the time may vary from 0.1 to 24 hours.

At the end of the reaction, the mixture is cooled. It may be used without purification, or it may be purified, for example by extraction with aliphatic hydrocarbons, usually of from 5 to 10 carbon atoms, and filtered. Occasionally, excess amine will be removed by washing with dilute mineral acid followed by washing with mild aqueous base.

The mole ratio of material used will vary with the reactants as well as the desired product. When a monoalkenyl succinimide is desired the mole ratios of the amine moiety to the succinic anhydride or acid will generally be in the range from 0.8 to 5, more usually in the range of 0.8 to 2. On the other hand when dialkenyl succinimides and trialkenyl succinimides are desired the mole ratios of the amine moiety to the succinic anhydride or acid will be considerably lower and in the range of from 0.4 to 0.6 for the diimide or in the range from 0.3 to 0.4 for the triimide.

The monoalkenyl succinimide compound, which is considered to be the major product formed by the reaction between approximately equal molar proportions of the succinic anhydride or acid and the tris(aminoalkylene) amine, has the following formula:

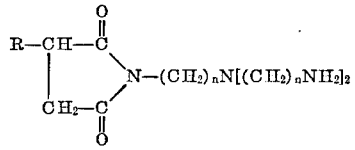

wherein R is an alkenyl group of from about 30 to 200 carbon atoms and $n$ is an integer of from 2 to 3.

The dialkenyl succinimide compound which is the major product formed by the reaction between approximately two moles of the succinic anhydride or acid and one mole of the tris(aminoalkylene) amine has the following formula:

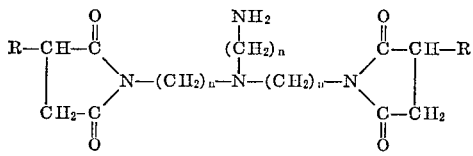

and the trialkenyl succinimide formed by reaction between approximately three moles of the succinic anhydride or acid and one mole of the tris(aminoalkylene) amine has the following formula:

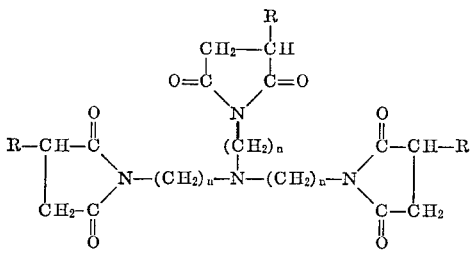

wherein R and $n$ are as defined above.

The compounds of this invention can be used with various base oils which find use as lubricating oils, such as naphthenic base, paraffin base and mixed base petroleum lubricating oils; other hydrocarbon lubricants, e.g., alkylene polymers (such as polymers of propylene, butylene, etc., and the mixtures thereof); alkylene oxide type polymers (e.g., propylene oxide polymers) and derivatives, including alkylene oxide polymers prepared by polymerizing the alkylene oxide in the presence of water or alcohols, e.g., ethyl alcohol; dicarboxylic acid esters (such as those which are prepared by esterifying such dicarboxylic acids as adipic acid, azelaic acid, suberic acid, sebacic acid, alkenylsuccinic acid, fumaric acid, maleic acid, etc., with alcohols, such as butyl alcohol, hexyl alcohol, 2-ethylhexyl alcohol, dodecyl alcohol, etc.); liquid esters of acids of phosphorus; alkylbenzenes (e.g., monoalkylbenzene, such as dodecylbenzene, tetradecylbenzene, etc., and dialkylbenzenes, e.g., n-nonyl-(2-ethylhexylbenzene); polyphenyls, e.g., biphenyls and terphenyls; alkylbiphenyl ethers; silicon compounds, e.g., tetraethyl silicate, tetraisopropyl silicate, tetra-(4-methyl-2-tetraethyl) silicate, hexyl-(4-methyl-2-pentoxy) disiloxane, poly(methyl) siloxane, poly(methylphenyl) siloxane, etc.

The above base oils may be used individually or in combination whenever miscible or made so by the use of mutual solvents.

The above-described alkenyl succinimides of this invention can be used in oils of lubricating viscosity in amounts of from 0.1 percent to 80 percent by weight. When the oil is to be used in an engine, usually the amount will be 0.1 to 10 weight percent, more usually 0.25 to 5 weight percent. However, the excellent solubility of the compounds of this invention in oil permits their formulation as concentrates, which may be diluted prior to use. As concentrates, the amount of the alkenyl succinimide may range from 10 to 80 percent.

Preferably, a zinc O,O-dihydrocarbyl dithiophosphate is used in the engine oil with the detergents of this invention. (Hydrocarbyl is a monovalent organic radical containing only carbon and hydrogen and includes aliphatic, alicyclic and aromatic radicals.) The hydrocarbyl groups are of from 4 to 36 carbon atoms, and about 6 to 50 mM./kg. of the dithiophosphate is used. Preferably, the hydrocarbyl groups are alkyl or alkaryl.

The following examples are offered by way of illustration and not by way of limitation.

Example 1

Into a reaction flask was introduced polyisobutenyl succinic anhydride (approximately 1,000 molecular weight) as a 48 weight percent solution in oil (244 g., 0.10 mole) and tris(aminoethylene) amine (12 g., 0.083 mole), and the mixture heated at 302° F. for 0.5 hour. Analysis: Percent total N=1.61, percent basic N=0.81.

In order to demonstrate the excellent detergency of the compounds of this invention, the exemplary compound prepared in Example 1 was used in a variety of stringent engine tests. Using the Caterpillar 1-G Test under MIL-L-45199 conditions, employing 3.5 weight percent of the composition of Example 1 in a Mid-Continent SAE 30 base oil, to which was added 12 mM./kg. of zinc O,O-di(alkylphenyl) phosphorodithioates (alkyl is polypropylene of 12 to 15 carbon atoms), the following results were obtained. Groove deposits: 73–2–0.2–0.3; land deposits: 255–5–35. By comparison, the base oil plus the phosphorodithioates has groove deposits of 95–15–5–3; land deposits: 500–800–320.

The groove numbers refer to percentage deposits in the piston ring grooves; a 0 evaluation being a clean groove; a number of 100 being a groove full of deposits. The land numbers refer to the piston lands which are examined visually. To a piston skirt which is completely black is assigned a number of 800; to one which is completely clean is assigned a number of 0; to those intermediate between completely black and completely clean are assigned numbers intermediate in proportion to the extent and degree of darkening.

A further test was the Caterpillar 1-H Test carried out for 60 hours using 3.5 weight percent of the composition prepared in Example 1, in a Mid-Continent SAE oil, 9 mM./kg. of zinc O,O-di(alkylphenyl) phosphorodithioate (the alkyl groups are derived from propylene polymers having an average of about 14 carbon atoms) and 3 mM./kg. of the dithiophosphate used in the previous test. Using the rating system described above, the groove deposits were 2–1–0–0.5; the land deposits were 30–10–25. By comparison, for the base oil, the grooves were: 49–10–10–9–2 and for the lands: 800–800–800–770. (The test with base oil was made with a similar piston but which in this case had five rings.)

The effectiveness of the compounds of the invention is also shown by comparison with commercially successful compositions consisting of a similar base oil containing a monoalkenyl succinimide of tetraethylene pentamine prepared by the reaction of approximately equal molar proportions of the same polyisobutenyl succinic anhydride with tetraethylene pentamine. In the Caterpillar 1-H Test carried out for 60 hours using 3.5 weight percent of the monoalkenyl succinimide and the phosphorodithioate mixture mentioned above groove deposits were 15–2–1–0.3–0 and the land deposits were 105–50–65–0.

The exemplary compounds of this invention were also tested in the Sequence 5 Test which is described in "Engine Test Sequences for Evaluating Automotive Lubricants for API Service MS," ASTM Special Technical Publication No. 315A, 1963, page 19. The test is described as providing operating conditions likely to require special lubricant characteristics to reduce engine deposits produced by low and medium temperature operating conditions. Emphasis is placed on anti-sludging, anti-clogging and insoluble suspension characteristics of the lubricant. The oil composition tested comprised 1.46 g. of a 50 weight percent solution in oil of the exemplary composition of Example 1, 16 mM./kg. of zinc dialkyl dithiophosphate (alkyl groups of from 4 to 6 carbon atoms) and 2 mM./kg. of zinc O,O-di(alkylphenyl) phosphorodithioate (the alkyl groups are polypropylene of from 12 to 15 carbon atoms) in a Mid-Continent SAE 30 oil. The run was carried out for 192 hours and had a total rating of 35.1 (50 clean), showing excellent effectiveness of the exemplary composition as a detergent.

Using the same composition as described for the Sequence 5 Test, an L–38 Test was carried out (CRC L–38–559). The run was carried out for 40 hours and the bearing weight loss was 70.8 mg.

Example 2

Polyisobutenyl succinic anhydride of approximately 1,000 molecular weight in an approximately 40 weight percent solution in oil amounting to 1,370 grams (0.58 mole) and 29.2 grams (0.2 mole) of tris(aminoethylene) amine were charged to a reaction flask. The mixture in the flask was heated up to 330° F. with stirring and under a slight nitrogen stream. These conditions were maintained for two hours. Analysis: percent total N=0.80, 0.79.

The trialkenyl succinimide of tris(aminoethylene) amine of this example was compounded in a typical mineral lubricating oil composition along with the zinc dialkyl phenyl phosphorodithioate mentioned above. The detergent properties of the composition were demonstrated in the Caterpillar engine test.

Example 3

Into a reaction flask was charged 65.7 grams (0.450 mole) of tris(aminoethylene) amine and 2,436 grams (1.305 mole) of an approximately 40 weight percent oil solution of polyisobutenyl succinic anhydride containing an average of 47 carbon atoms in the alkenyl group. The mixture was heated to 330° F. with stirring under a stream of nitrogen for two hours. Analysis: percent total N=1.06, 1.04.

Example 4

Using the procedure outline above, 40.3 grams (0.276 mole) of tris(aminoethylene) amine and 1,300 grams (0.5520 mole) of polyisobutenyl succinic anhydride (approximately 1,000 molecular weight) in a 40 weight percent oil solution were reacted. Analysis: percent total N=1.18, 1.19.

It is evident from the above data that the succinimides of this invention provide excellent detergency under a wide variety of operating conditions. That is, the tests vary from engines running under relatively cold conditions to engines running under relatively hot conditions, from automobile engines to diesel engines.

As will be evident to those skilled in the art, various modifications on this invention can be made or followed in the light of the foregoing disclosure and discussion, without departing from the spirit or scope of the disclosure or from the scope of the following claims.

I claim:

1. A composition consisting essentially of at least one compound selected from the group consisting of:

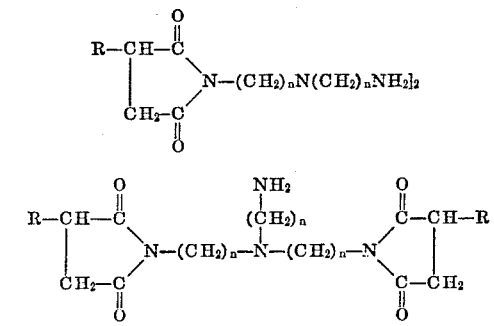

and

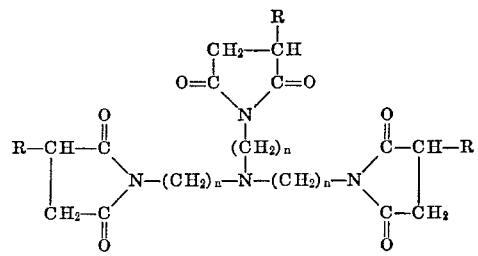

wherein R is an alkenyl group of from 30 to 200 carbon atoms and $n$ is an integer of from 2 to 3.

2. A composition according to claim 1, wherein $n$ is 2 and R is polyisobutenyl.

3. A lubricating oil composition comprising a major proportion of an oil of lubricating viscosity and in an amount sufficient to provide detergency a composition as set forth in claim 1.

4. A lubricating oil composition comprising a major proportion of an oil of lubricating viscosity and in an amount sufficient to provide detergency a composition as set forth in claim 2.

References Cited

UNITED STATES PATENTS 3,219,666 11/1965 Norman et al. ____ 252—51.5 XR
3,272,746 9/1966 Le Suer et al. ____ 252—51.5 XR PATRICK P. GARVIN, *Primary Examiner.*

U.S. Cl. X.R.

260—326.3, 326.5